United States Patent
Tsai

(10) Patent No.: US 8,558,418 B2
(45) Date of Patent: Oct. 15, 2013

(54) VOICE COIL MOTOR

(75) Inventor: Ching-Lung Tsai, Hsinchu (TW)

(73) Assignee: Vasstek International Corp., Zhunan Science-Based Industrial Park, Zhunan Township, Miaoli County (TW)

( * ) Notice: Subject to any disclaimer, the term of this patent is extended or adjusted under 35 U.S.C. 154(b) by 327 days.

(21) Appl. No.: 12/954,923

(22) Filed: Nov. 29, 2010

(65) Prior Publication Data

US 2012/0051194 A1    Mar. 1, 2012

(30) Foreign Application Priority Data

Aug. 31, 2010 (TW) .................................. 99129409 A

(51) Int. Cl.
  *H02K 33/00* (2006.01)
  *G11B 11/00* (2006.01)
  *H02K 41/03* (2006.01)

(52) U.S. Cl.
  USPC ............... 310/12.16; 318/126; 369/13.02; 359/824; G9B/11

(58) Field of Classification Search
  USPC ............... 318/126; 369/13.02; 310/12.16; 359/824
  See application file for complete search history.

(56) References Cited

U.S. PATENT DOCUMENTS

| | | | | |
|---|---|---|---|---|
| 3,917,394 A * | 11/1975 | Sturdevant | .................. | 353/101 |
| 4,562,562 A * | 12/1985 | Moriya et al. | ............... | 369/30.15 |
| 5,023,733 A * | 6/1991 | Koga et al. | .................. | 360/77.04 |
| 5,200,776 A * | 4/1993 | Sakamoto | ........................ | 396/86 |
| 5,333,083 A * | 7/1994 | Nakano | ........................ | 360/77.04 |
| 5,561,568 A * | 10/1996 | Kisaka | ......................... | 360/78.04 |
| 5,659,438 A * | 8/1997 | Sasamoto et al. | ............ | 360/78.09 |
| 5,694,265 A * | 12/1997 | Kosugi et al. | ............... | 360/77.05 |
| 5,768,045 A * | 6/1998 | Patton et al. | ................ | 360/78.04 |
| 5,805,374 A * | 9/1998 | Kisaka | ........................ | 360/78.04 |
| 5,854,715 A * | 12/1998 | Takagi | ............................ | 360/53 |
| 5,859,743 A * | 1/1999 | Kisaka | ......................... | 360/78.04 |
| 5,898,535 A * | 4/1999 | Kawai | .......................... | 360/77.02 |
| 6,166,871 A * | 12/2000 | Takaishi | ........................ | 360/53 |
| 6,335,909 B1 * | 1/2002 | Hashimoto | ................. | 369/44.29 |
| 6,600,280 B2 * | 7/2003 | Kanda | ........................... | 318/433 |
| 6,674,701 B2 * | 1/2004 | Okumura et al. | ............. | 369/47.5 |
| 7,309,932 B2 | 12/2007 | Tseng | | |
| 7,400,068 B2 | 7/2008 | Tseng | | |
| 7,595,947 B2 * | 9/2009 | Lee et al. | ...................... | 359/824 |
| 8,188,860 B2 * | 5/2012 | Haid | ............................. | 340/540 |
| 2004/0000903 A1 | 1/2004 | Morimoto | | |
| 2005/0232090 A1 * | 10/2005 | Matsumoto et al. | ......... | 369/30.1 |
| 2006/0055252 A1 | 3/2006 | Tseng | | |
| 2006/0214520 A1 | 9/2006 | Tseng | | |
| 2007/0098087 A1 * | 5/2007 | Chiang | ........................ | 375/242 |
| 2009/0102643 A1 * | 4/2009 | Haid | ............................. | 340/540 |

* cited by examiner

*Primary Examiner* — Tran Nguyen
*Assistant Examiner* — Alex W Mok
(74) *Attorney, Agent, or Firm* — Winston Hsu; Scott Margo

(57) ABSTRACT

A voice coil motor (VCM) includes a lens carrier physically connected to a magnetic device, an electromagnetic driving apparatus, constructed by a coil, a magnetic sensing element, a storage media and a controller. The magnetic sensing element detects a location of the lens carrier and outputs the location value relating to the location of the lens carrier via an amplifier. The storage media stores a gain value and an offset compensation value relating to the amplifier. The controller can make the lens carrier move between a top position and a bottom position in which the lens carrier can be moved within the voice coil motor. The lens carrier is moved using the coil interaction with a magnetic field of the magnetic device when current is applied to the coil.

9 Claims, 5 Drawing Sheets

| Value of gain register | Gain of amplifier |
|---|---|
| 0 | 10 times |
| 1 | 15 times |
| 2 | 20 times |
| 3 | 25 times |
| 4 | 30 times |
| 5 | 35 times |
| 6 | 40 times |

FIG. 3A

| Value of offset register | offset |
|---|---|
| 0 | -140 |
| 1 | -120 |
| 2 | -100 |
| 3 | -80 |
| 4 | -60 |
| 5 | -40 |
| 6 | -20 |
| 7 | 0 |
| 8 | 20 |
| 9 | 40 |
| 10 | 60 |
| 11 | 80 |
| 12 | 100 |
| 13 | 120 |
| 14 | 140 |

FIG. 3B

VOICE COIL MOTOR

BACKGROUND OF THE INVENTION

1. Field of the Invention

The present invention relates to a voice coil motor, and more particularly, to a voice coil motor with a storage medium storing a gain value and an offset compensation value.

2. Description of the Prior Art

In order to perform a more accurate position control for a set of lenses or an access arm of a hard disk drive, a voice coil motor (VCM) is usually adopted to move the set of lenses or the access arm of the hard disk drive. The structure of a VCM is primarily a coil placed within a magnetic circuit including a permanent magnet.

In an optical system employing a VCM, there is an interaction propelling force between the coil and the permanent magnet according to Fleming's left-hand rule that moves a carrier physically connected to the permanent magnet when a current flows through the coil; at the same time, a set of lenses which is attached to the carrier is moved correspondingly, so as to achieve optical zoom and focus functionalities. Based on applying a specific current value through the coil, an accurate control for optical zooming and focusing can be achieved.

In general, in order to accurately control the lens carrier of a voice coil motor, one must have a clear knowledge of the location of the lens carrier, and Hall sensors are used to perform such detection.

FIG. 1 schematically illustrates a diagram of a VCM system of the prior art. As shown in FIG. 1, the VCM system comprises a computing platform 10, a VCM 11, a controller 12, and a Hall sensor 13. The controller 12 and the Hall sensor 13 are integrated together into the VCM 11. The Hall sensor 13 outputs a voltage signal via an output terminal as long as the Hall sensor 13 detects magnetic field strength when a lens carrier (not shown) physically connected with a magnetic device (not shown) is moved accordingly, and then the controller 12 determines the current location of the lens carrier based on the magnetic field strength.

In mass production, however, it is almost impossible to provide a magnetic device with the exact characteristics that would maintain absolute consistency of relative position after the majority of components in the VCM 11 are assembled resulting in the VCM 11 having slightly different control features. That is, when there are different VCMs 11 with lens carriers in the same position, the Hall sensor 13 detection of the magnetic field strength may not be the same.

When the magnetic strength of the magnetic device inside the VCM 11 is smaller or the gap between the magnetic device and the Hall sensor 13 is relatively large, this only enables the Hall sensor 13 to detect a magnetic field strength smaller than the theoretical value. When the magnetic strength of the magnetic device inside the VCM 11 is larger or the gap between the magnetic device and the Hall sensor 13 is relatively small, this only enables the Hall sensor 13 to detect a magnetic field strength larger than the theoretical value.

To solve the problem, a compensation scheme, such as an adjustable gain value and an adjustable offset compensation value relating to the amplifier, can also be used in the controller 12 to allow each VCM to have the same operation mode. The gain of the amplifier is raised to compensate for variation if the magnetic field strength detected by the Hall sensor 13 is lower than the theoretical one. The gain of the amplifier is reduced to compensate for the variation if the magnetic field strength detected by the Hall sensor 13 is higher than the theoretical one.

However, the compensation scheme employed by the controller 12 wherein an amplifier compensates the variation using the adjustable gain value and the adjustable offset compensation value, has some problems in the prior art. Firstly, a manufacturing volume of VCM extracts an optimal amplifier gain value and an offset compensation value, and these values are used as a standard to test all the VCMs during mass production. This method will increase the amount of defective VCMs and lower the yield rate because the tolerance variation among VCMs is usually large in mass production. Secondly, the gain value and the offset compensation value of the amplifier of the VCM are extracted from each VCM in the manufacturing process one by one. Although this method will increase the amount of good VCMs and yield rate, the user, such as a camera module manufacturer or a phone manufacturer, needs to detect the gain value and the offset compensation value appropriate for the amplifiers one by one.

SUMMARY OF THE INVENTION

In the prior art, users must extract an optimal amplifier gain value and an offset compensation value through each voice coil motor (VCM) resulting in high testing cost and long initialization time during application. For this reason, the main purpose of this invention is to provide a VCM that includes a storage media which at least stores a signal amplifier gain value and an offset compensation value previously test completed and stored. In this way, the controller reads out the amplifier gain value and the offset compensation value from the storage media and, based on these values, makes corrections through a signal amplifier so as to allow the amplifier to output the maximum location resolution providing more precise control of the VCM. The user no longer needs to perform the complicated detection one by one and can rapidly complete initialization.

To realize the objectives mentioned above, the present invention provides a VCM comprising a lens carrier physically connected with a magnetic device, an electromagnetic driving apparatus, constructed by a coil, a magnetic sensing element, a storage media and a controller. The magnetic sensing element detects a location of the lens carrier and outputs the location value relating to the location of the lens carrier via an amplifier. The storage media stores a gain value and an offset compensation value relating to the amplifier. The controller can move the lens carrier of the voice coil motor between a top position and a bottom position. The lens carrier is moved using the interaction between the coil and a magnetic field of the magnetic device when current is applied to the coil. The controller can make the lens carrier move between a top position and a bottom position according to the location value from the amplifier corrected by the gain value and the offset compensation value from the storage media.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3A and FIG. 3B are schematic diagrams of an exemplary look up table illustrating other aspects of the present invention.

DETAILED DESCRIPTION

Figure 1:
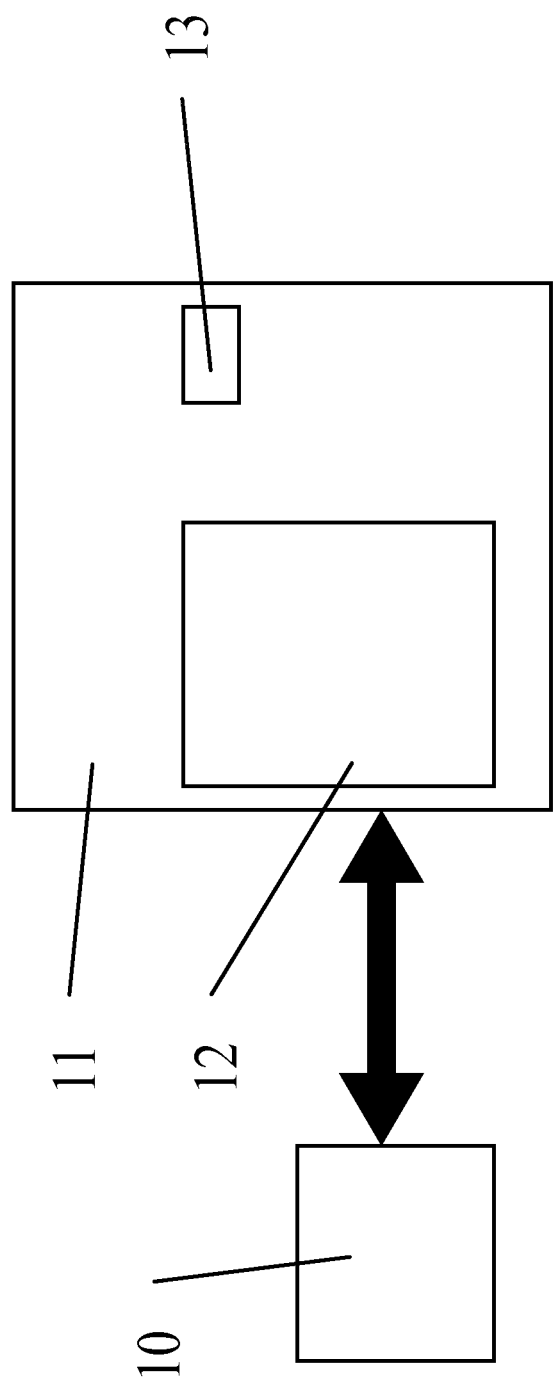
FIG. 1 is a schematic diagram illustrating a conventional voice coil motor (VCM).
Figure 2A:
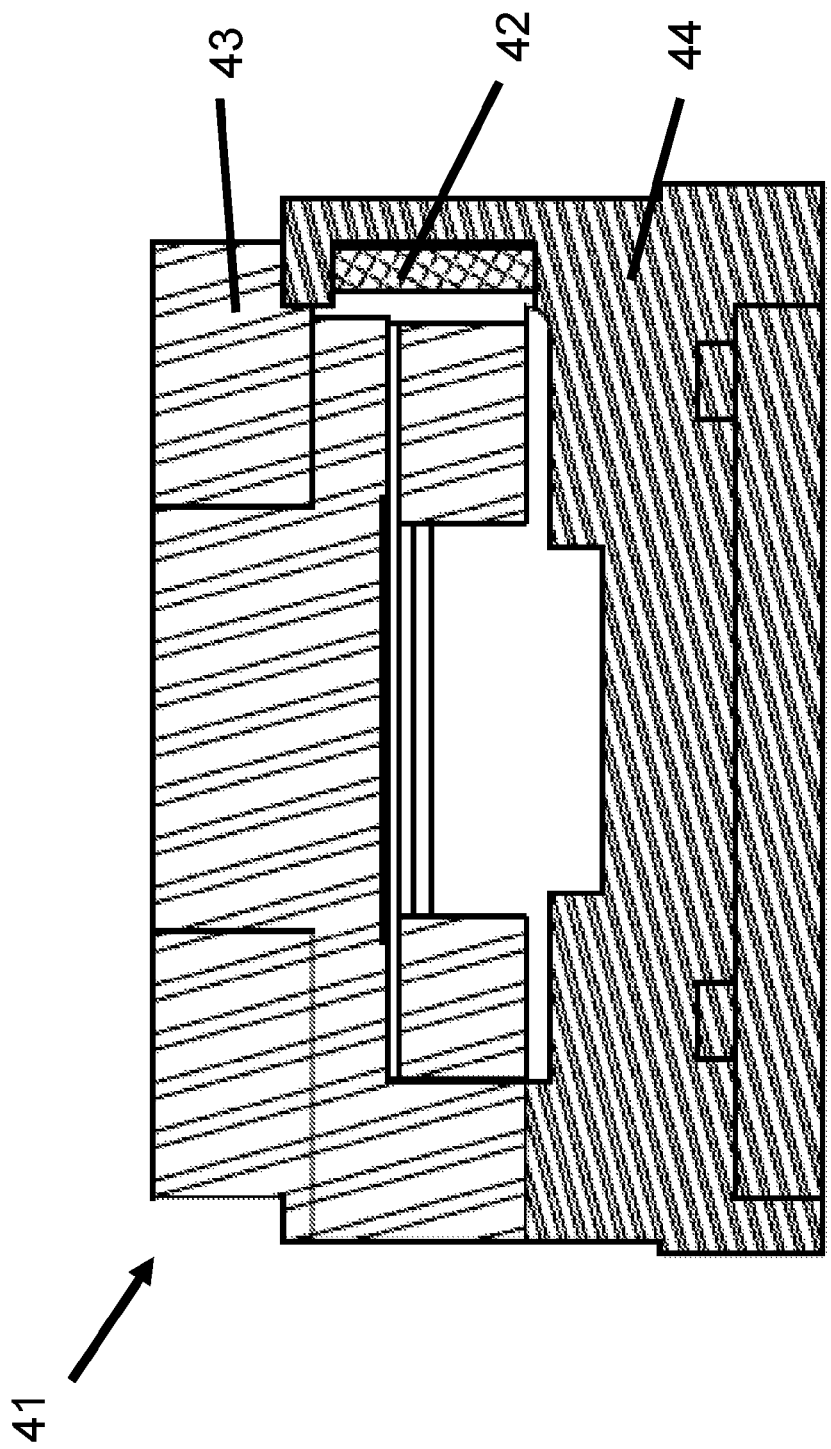
FIGS. 2A and FIG. 2B are schematic diagrams of an exemplary voice coil motor illustrating some aspects of the present invention.
Figure 2B:
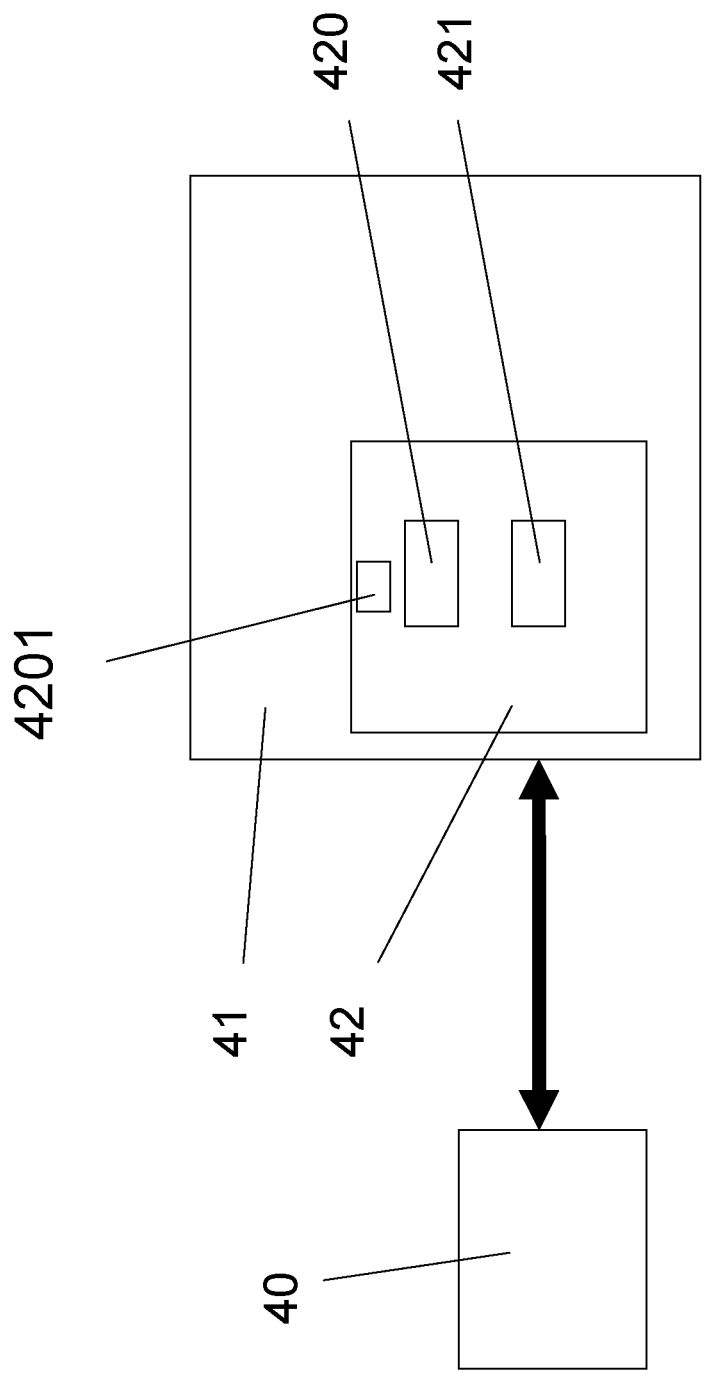

Please refer to FIG. 2A and FIG. 2B in correspondence with the following description. FIG. 2A and FIG. 2B are schematic diagrams illustrating a voice coil motor (VCM) 41 comprising a lens carrier 43 physically connected with a magnetic device, an electromagnetic driving apparatus 44, constructed by a coil, a magnetic sensing element 420 such as a Hall sensor, a storage media 421 and a controller 42. The storage media 421 and the controller 42 can be integrated together into a single chip or the storage media 421, and the magnetic sensing element 420 and the controller 42 can be integrated together into a single chip. The magnetic sensing element 420 detects a location of the lens carrier 43 and outputs a location value relating to the location of the lens carrier 43 via an amplifier 4201. The maximum working electrical range of the amplifier 4201 is defined as zero to the maximum native location value.

Briefly, as illustrated in FIG. 2B, the storage media 421 within the VCM 41 stores a gain value and an offset compensation value relating to the amplifier 4201. The controller 42 reads the gain value and the offset compensation value from the storage media 421, and then the output of the amplifier 4201 is corrected using the gain value and the offset compensation value so that the amplifier 4201 outputs the location value with a maximum resolution as the detailed description will describe later. The controller 42 can make the lens carrier 43 move accurately within the VCM 41 between the top position and the bottom position, using the interaction between the coil and a magnetic field of the magnetic device when current is applied to the coil; at the same time, a set of lenses which is attached to the lens carrier 43 is moved correspondingly, so as to achieve optical zoom and focus functionalities. The user does not need to detect the gain value and the offset compensation value appropriate for amplifier 4201 one by one by a computing platform 40, which reduces high test cost and the long initialization time.

The gain value and the offset compensation value stored by the storage media 421 are selected from a database as illustrated in FIGS. 3A and 3B having a plurality of values using a filter scheme of the computing platform 40 that needs to meet requirements described below. The gain value and the offset compensation value stored by the storage media 421 can cause the amplifier 4201 to be corrected to output the location value with the maximum resolution. That is, the location value from the amplifier 4201 has maximum resolution when the controller 42 issues a move command to the lens carrier 43, in which a moveable step for the lens carrier 43 is a maximum number of steps to move the lens carrier 43 according to the location value from the amplifier 4201 corrected by the gain value and the offset compensation value from the storage media 421. Furthermore, the location value from the amplifier 4201 is at maximum resolution when the difference of the top position and the bottom position is at maximum value.

Please refer to FIG. 3A and FIG. 3B in correspondence with the following description. FIG. 3A and FIG. 3B are schematic diagrams illustrating a lookup table. To select the gain value and the offset compensation value from the look up table and to store them into the storage media 421, the filter scheme of the computing platform 40 is used.

In the selecting process, the computing platform 40 temporarily selects one of the pluralities of values from the database as illustrated in FIGS. 3A and 3B, and then a value of a gain register is set. The controller 42 moves the lens carrier 43 into the top position and the bottom position individually and the location values of the lens carrier at the top position and at the bottom position are detected by the magnetic sensing element 420. The selected temporarily value is stored into the storage media 421 if the location value has the maximum resolution. Assume the amplifier 4201 is able to operate in a maximum native location value of 0 to 511. It should be noted, however, that the actual amplifier 4201 is not practically able to obtain such a small and large output. The ranges of the location values of the amplifier 4201 in the real VCM can approach the ranges of the maximum and minimum native location values through the use of the gain value and the offset compensation value after compensation.

For example, assume initially the computing platform 40 selects the value of the gain register as 0, and sets the gain of the amplifier 4201 to 10 times as illustrated in FIG. 3A. The controller 42 moves the lens carrier 43 into the top position and bottom position individually, and then the computing platform 40 detects the location values of the lens carrier 43 at the top position and at the bottom position as 100 and 200 individually. The absolute value of the location value between the top position and the bottom position is 100 (200−100). Suppose the target absolute value of the location value is 306 (511×60%), in which the location value has the maximum resolution, and then the gain of the amplifier 4201 needs to be raised 3.06 times the original value. The computing platform 40 should select the gain as 35 times, and the gain register should be set to 5 as illustrated in FIG. 3A. A median of the location value between the top position and the bottom position is 150 ((100+200)/2) in the real VCM. Suppose the target median of the location value is 256 (511/2), in which the location value has the maximum resolution, and then the offset is 100 because the result is (256−150=106). The computing platform 40 should select the offset as 100, and the offset register should be set to 12 as illustrated in FIG. 3B. The results, i.e. the value of the gain register is 5 and the value of the offset register is 12, will be stored into the storage media 421.

Through practical experimentation, the location value of the lens carrier 43 at the top position is within 70% to 100% of the maximum native location value, in which the amplifier 4201 is operated in the maximum output mode without the amplifier offset, and the location value of the lens carrier 43 at the bottom position is within 0% to 30% of the maximum native location value. For example, the maximum native location value is 511, an output range of the amplifier 4201 is 0 to 511, and the location value of the lens carrier 43 at the top position is within 357.7 to 511 and the location value of the lens carrier 43 at the bottom position is 0 to 153.3 (511×30%). The location value of the lens carrier 43 at the top position is best within 90% to 100% of the maximum native location value and the location value of the lens carrier 43 at the bottom position is best within 0% to 10% of the maximum native location value.

Furthermore, the storage media 421 stores a full length, which is detected by an external means, of a move path of the top position to the bottom position of the lens carrier 43 within the voice coil motor 41. The controller 42 makes the lens carrier 43 move between the top position and the bottom position, using the interaction between the coil and the magnetic field of the magnetic device when current is applied to the coil, according to a ratio of the full length and the absolute value of the location value between the top position and the bottom position. The ratio of the full length of the move path and the absolute value of the location value between the top position and the bottom position is a move length of the lens carrier per unit of the location value. For example, the ratio of the full length of the move path and the absolute value of the location value is 0.3 mm/200 units so that the lens carrier 43 can be moved to 0.15 mm per 100 units.

Those skilled in the art will readily observe that numerous modifications and alterations of the device and method may be made while retaining the teachings of the invention.

What is claimed is:

1. A voice coil motor, comprising:
   a lens carrier, physically connected with a magnetic device;
   an electromagnetic driving apparatus, constructed by a coil;
   a magnetic sensing element, for detecting a location of the lens carrier and outputting the location value relating to the location of the lens carrier via an amplifier;
   a storage media, for storing a gain value and an offset compensation value relating with the amplifier; and
   a controller, for moving the lens carrier according to a ratio of a full length of a move path and a command value between a top position and a bottom position in which the lens carrier can be moved within the voice coil motor using the coil interaction with a magnetic field of the magnetic device when current is applied to the coil according to the location value from the amplifier corrected by the gain value and the offset compensation value from the storage media; wherein the full length is a maximum distance between the top position and the bottom position in which the lens carrier is allowed to be moved within the voice coil motor, and the command value is an absolute value of the location value of the lens carrier between the top position and the bottom position.

2. A voice coil motor according to claim 1, wherein the amplifier is corrected using the gain value and the offset compensation value stored by the storage media and outputs the location value with a maximum resolution.

3. A voice coil motor according to claim 2, wherein the location value from the amplifier is the maximum resolution when the controller receives a move command of the lens carrier, in which a moveable step for the lens carrier is a maximum number of steps to move the lens carrier according to the location value from the amplifier corrected by the gain value and the offset compensation value from the storage media.

4. A voice coil motor according to claim 2, wherein the location value from the amplifier is the maximum resolution and an absolute value of the location value between the top position and the bottom position is a maximum value.

5. A voice coil motor according to claim 1, wherein the location value of the lens carrier at the top position is within 70% to 100% of a maximum native location value, in which the amplifier is operated in a maximum output mode without an amplifier offset, and the location value of the lens carrier at the bottom position is within 0% to 30% of the maximum native location value.

6. A voice coil motor according to claim 5, wherein the location value of the lens carrier at the top position is best within 90% to 100% of a maximum native location value and the location value of the lens carrier at the bottom position is best within 0% to 10% of the maximum native location value.

7. A voice coil motor according to claim 1, wherein the ratio of the full length of the move path and the absolute value of the location value between the top position and the bottom position is a move length of the lens carrier per unit of the location value.

8. A voice coil motor according to claim 1, wherein the storage media and the controller are integrated together into a single chip.

9. A voice coil motor according to claim 1, wherein the storage media, the magnetic sensing element and the controller are integrated together into a single chip.

* * * * *